Patented Aug. 25, 1953

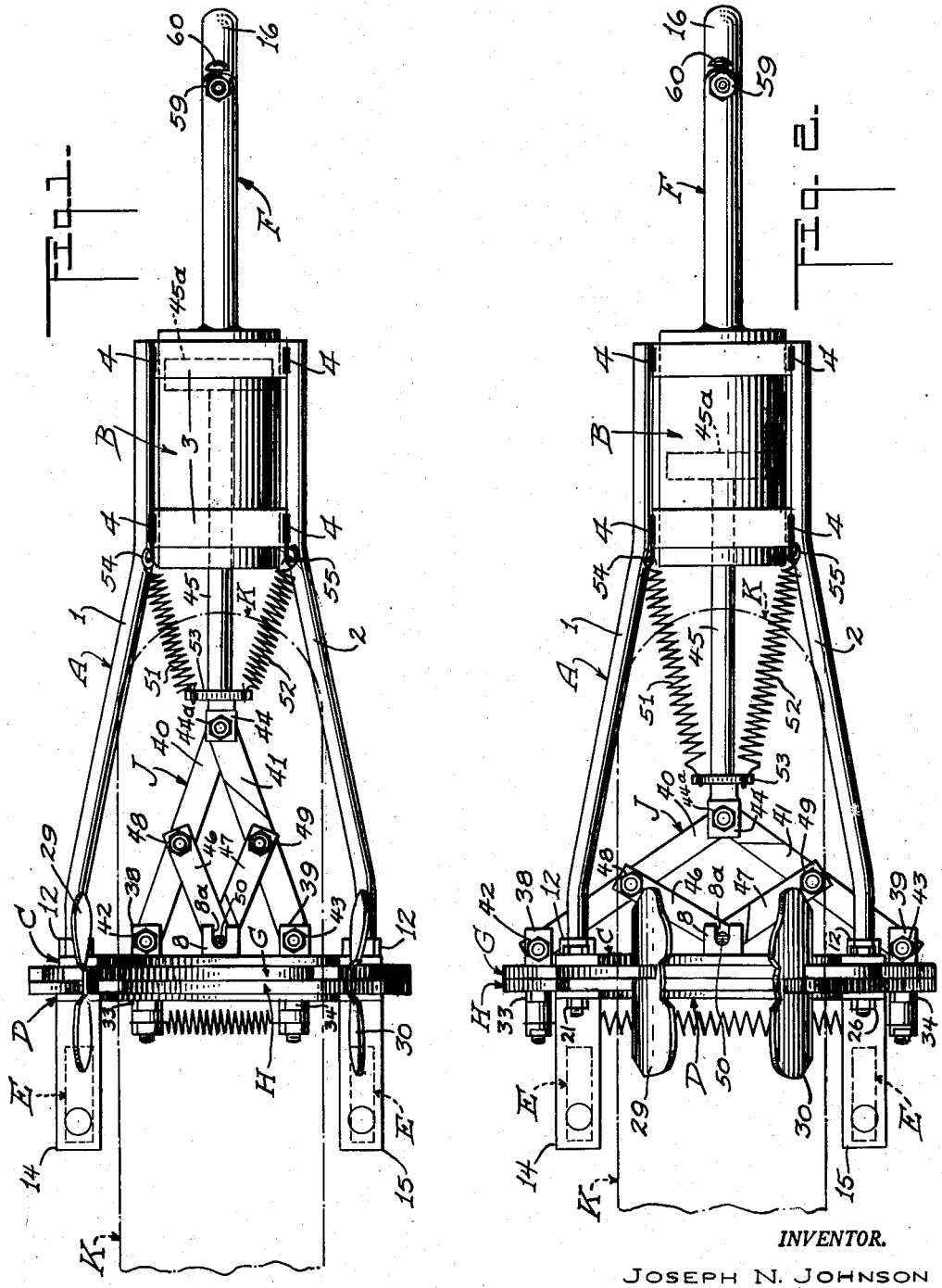

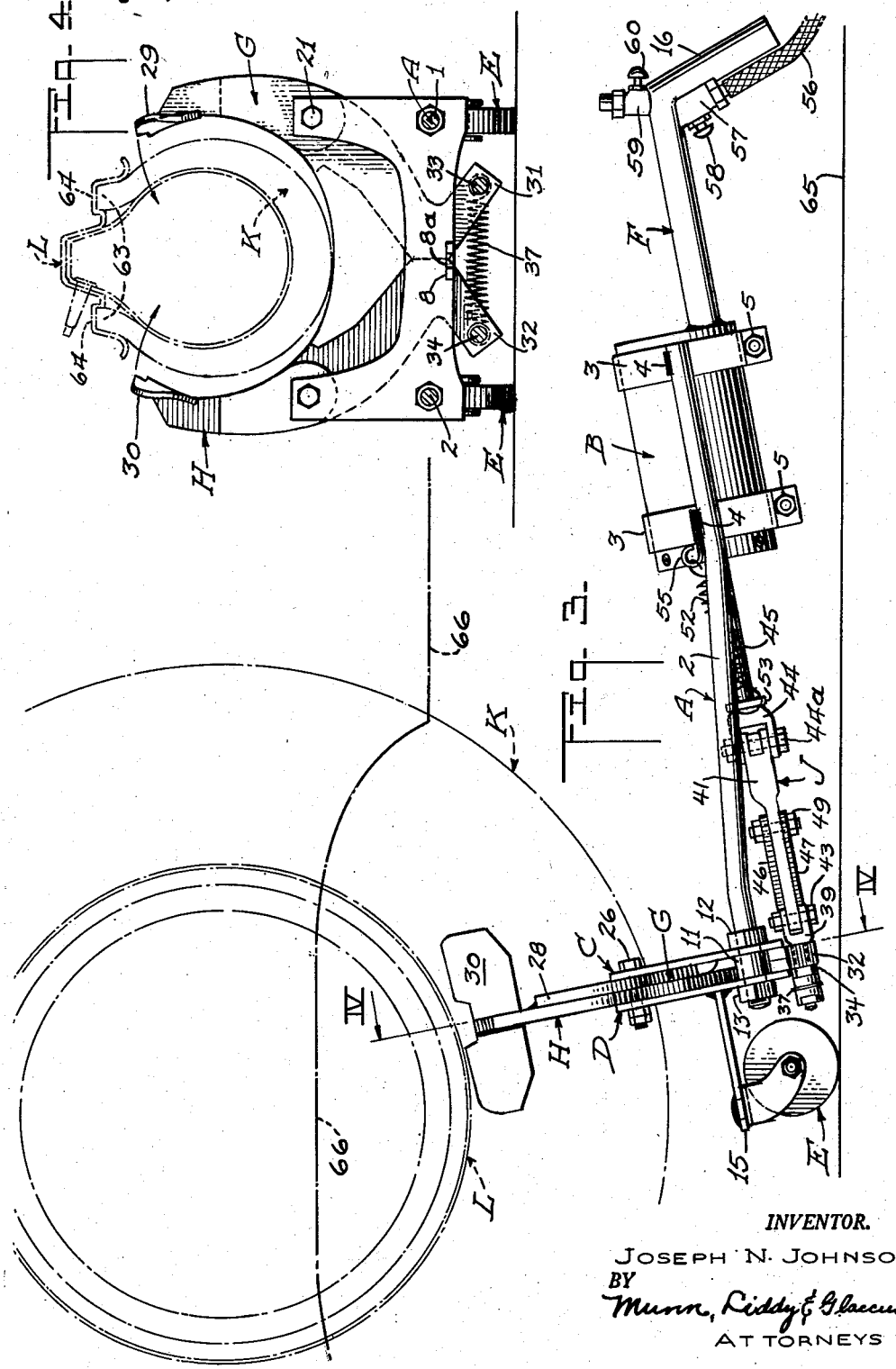

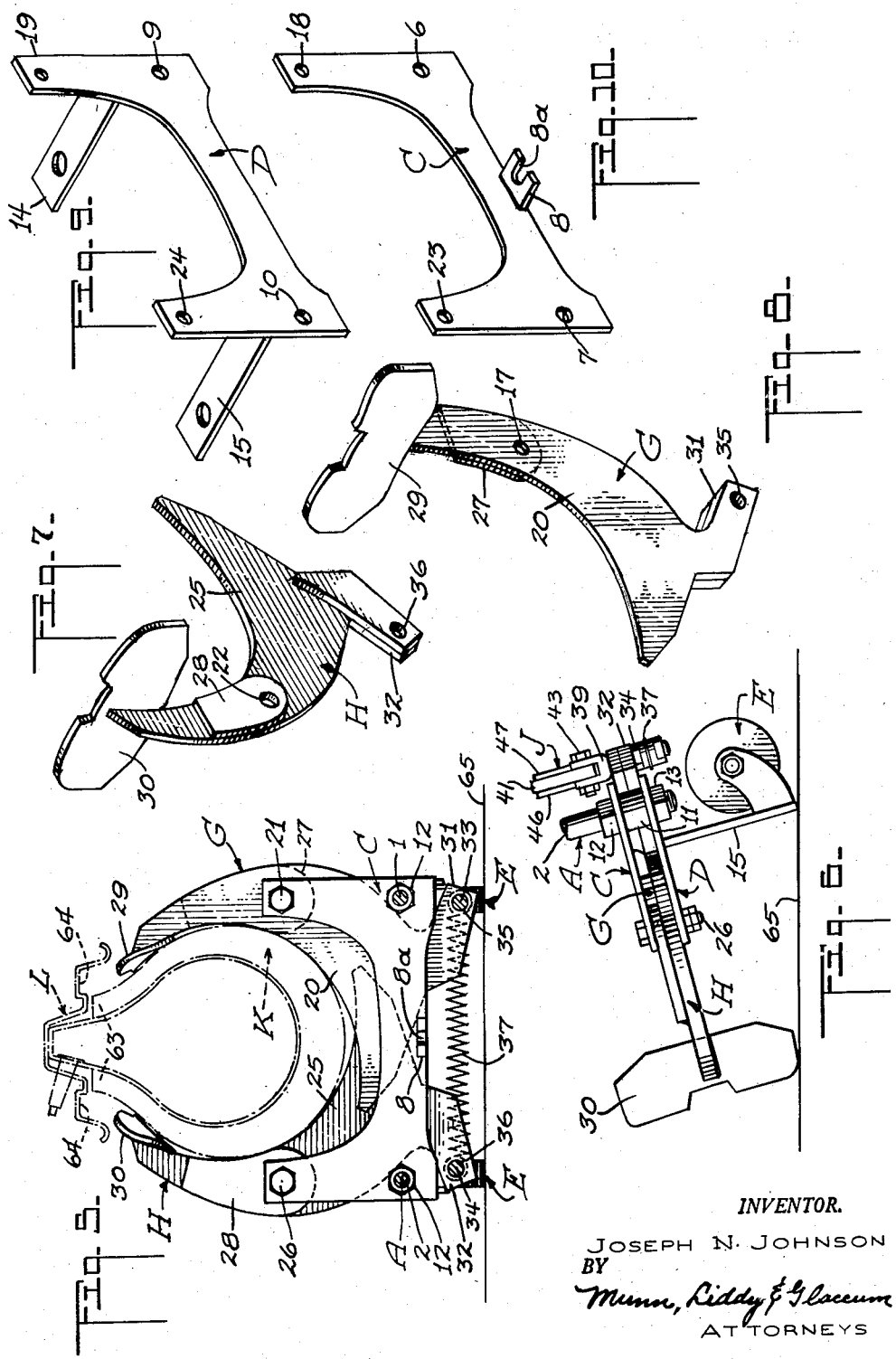

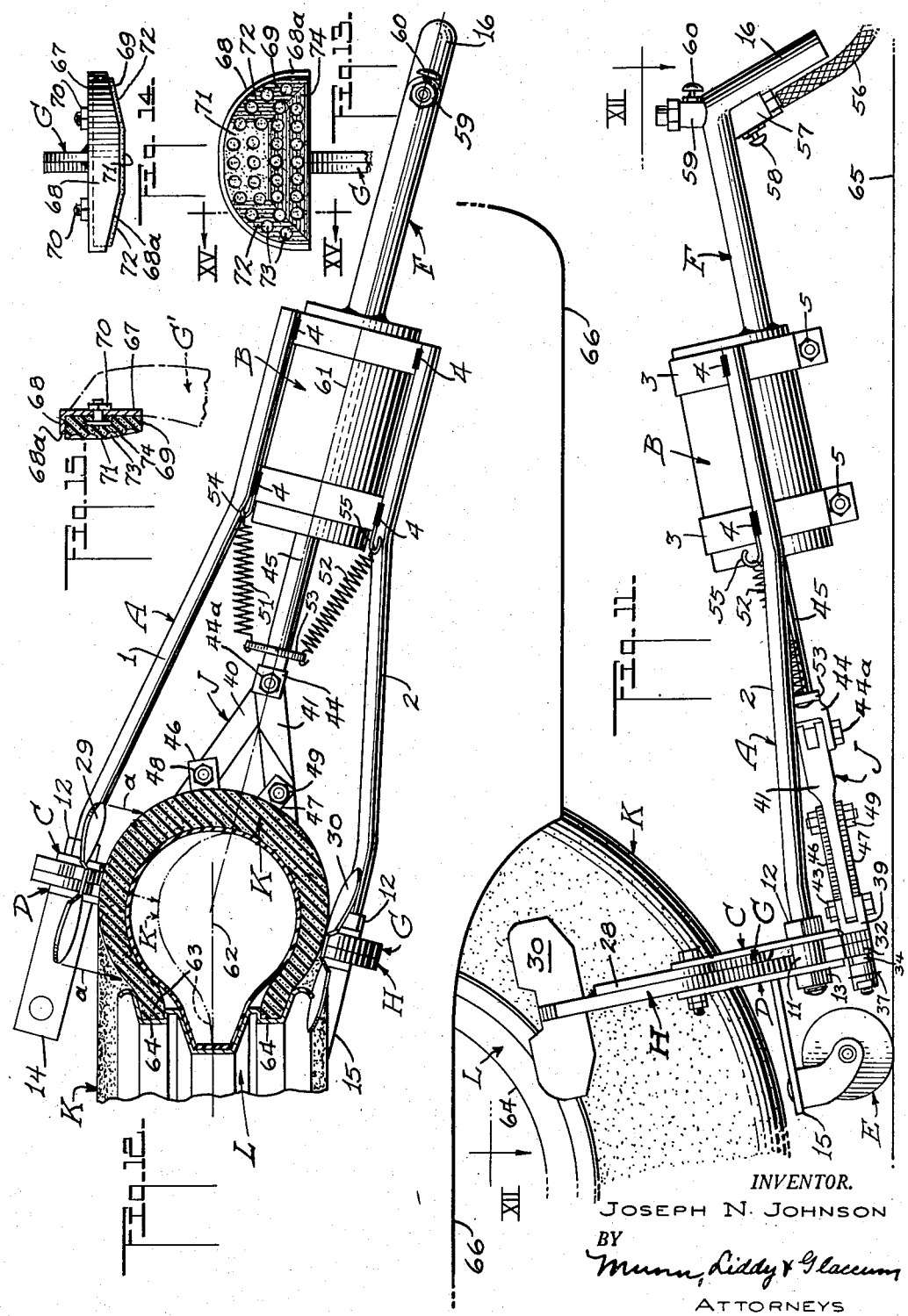

2,649,902

UNITED STATES PATENT OFFICE 2,649,902

POWER GRIP BEAD BREAKER FOR TIRES

Joseph N. Johnson, Oakland, Calif.

Application August 9, 1948, Serial No. 43,248

4 Claims. (Cl. 157—1.28)

The present invention relates to improvements in a power grip bead breaker for tires. It consists of the combinations, constructions and arrangements of parts as hereinafter described and claimed.

An object of my invention is to provide a power grip bead breaker for tires which is mounted on a pair of caster wheels so that the tire-engaging jaws can be readily moved under the fender of an automobile and into a position to grip opposite sides of a tire which is to be removed while the wheel is still on the axle. A handle permits the device to be moved quickly from place to place and the handle may be swung in a generally vertical direction for rocking the frame about the caster wheels as a pivot and thus raise or lower the jaws with respect to the tire.

The design of the frame and handle is such as to permit the jaws to engage with the lower portion of the tire after the wheel is jacked up. The tire and inner tube may be removed from the rim without first removing the wheel from the automobile. In removing a tire from a safety rim, one tire bead may be removed before the other one. In this event, the device is positioned so that one of the jaws will engage with the wheel rim and the other jaw will engage with the tire bead on the opposite side of the rim. The jaws are then moved toward each other with the result that the tire bead will be forced out of the rim and thus the casing and inner tube can be removed from the wheel while the latter is still connected to the automobile axle.

The handle that controls the movement of the device also carries the valve by means of which compressed air is admitted for manipulating the jaws. The operator therefore has complete control of the device at the place where he grips the handle.

Other objects and advantages will appear in the following specification, and the novel features of the device will be particularly pointed out in the appended claims.

My invention is illustrated in the accompanying drawings forming a part of this application, in which:

Figure 1 is a top plan view of the device showing the jaws in tire-receiving position.

Figure 2 is a view similar to Figure 1, but shows the jaws in tire gripping position;

Figure 3 is a side elevation of the device illustrating how the jaws engage with a tire while it is still on a wheel, the wheel being raised above the ground for permitting the jaws to engage with the lower portion of the tire;

Figure 4 is a transverse section taken along the line IV–IV of Figure 3;

Figure 5 is a view similar to Figure 4 and shows the jaws removing the tire beads from the rim;

Figure 6 is a side elevation of the portion of the device disposed adjacent to the wheels and illustrates how the device can be up-ended when not in use and thus take up little space;

Figures 7 and 8 are perspective views of the two jaws;

Figures 9 and 10 are perspective views of the jaw supporting members;

Figure 11 is a view similar to Figure 3, but shows one of the jaws engaging with a rim;

Figure 12 is a horizontal section taken along the line XII–XII of Figure 11;

Figure 13 is a face view of a suction pad used on the jaws;

Figure 14 is a top plan view of Figure 13; and

Figure 15 is a section taken along the line XV–XV of Figure 13.

While I have shown only the preferred forms of my invention, it should be understood that various changes or modifications may be made within the scope of the appended claims without departing from the spirit and scope of the invention.

In carrying out my invention, I provide a frame indicated generally at A and this frame is composed of two rods 1 and 2 shaped as illustrated in Figure 2. The rods 1 and 2 are secured to an air cylinder B by means of circular split bands 3 or other suitable fastening means. The bands frictionally grip the outer surface of the cylinder and in turn are connected to the members 1 and 2 by welding shown at 4. Figure 3 shows the split ends of the bands 3 connected together by bolts 5. The bolts may be tightened for clamping the bands about the cylinder.

At the lower end of the rods 1 and 2 I mount jaw supporting and guiding members C and D. The member C is shown in perspective in Figure 10 and it will be seen that it is provided with openings 6 and 7 through which the rods 1 and 2 extend. The member C carries a rearwardly extending lug 8 that has a recess 8a therein for a purpose hereinafter described.

The jaw supporting member D is shown in perspective in Figure 9 and this member has openings 9 and 10 for receiving the rods 1 and 2. Reference to Figure 3 shows spacing sleeves 11 mounted on the rods 1 and 2 and disposed between the jaw supporting members C and D. The portions of the rods 1 and 2 that extend through the members C and D are threaded for receiving nuts 12 and 13, and by this arrangement the members C and D are secured to the frame A and are spaced from each other in parallel relation. The planes of the members C and D extend substantially at right angles to the plane of the frame A.

Referring again to Figure 9, it will be seen that the member D has forwardly extending legs 14—15 and these legs in turn are supported by wheels indicated generally at E. A hollow handle F extends rearwardly from the cylinder B and communicates with the interior of the cylinder at the upper end thereof. The handle F has a hand grip portion 16 and this is grasped by the operator for moving the frame A in the desired direction. The two wheel supports E at the forward end of the frame enables the operator to swing the device into various positions by merely moving the hand grip 16 in the desired direction.

Before describing the power means which includes the feeding of compressed air into the cylinder B, I will first describe the jaws G and H and their operating mechanism. Figures 7 and 8 show the two jaws in perspective. The jaw G is shown in Figure 8 and jaw H is shown in Figure 7. The jaw G has an opening 17 that is aligned with the openings 18 and 19 of the members C and D when the shank 20 is placed between the members. A bolt 21, see Figure 2, is inserted through the aligned openings 17, 18 and 19 and in this way the jaw G is pivotally secured to the members.

The other jaw H has an opening 22 and this opening is aligned with openings 23 and 24 in the members C and D when the shank 25 of the jaw is placed between the members. Figure 2 shows a bolt 26 passed through the aligned openings 22, 23 and 24 and pivotally supporting the jaw H between the members. Both Figures 4 and 5 show how the bolts 21 and 26 pivotally support the jaws G and H. The jaw G is reinforced by a plate 27 which is made integral with the jaw shank 20 and which acts as a spacer for filling up the space between the members C and D. In like manner the jaw H is reinforced by a plate 28 which is made integral with the jaw shank 25 and which acts as a spacer for filling up the space between the members C and D. The plates 27 and 28 on the jaw shanks tend to prevent any twisting of the tire gripping portions 29 and 30 of the jaws with respect to their shanks. The structure is such that the shanks of the two jaws will have ample support from the members C and D during their swinging movement.

In Figure 8 I show the shank 20 of the jaw G provided with a lug 31 that extends at the angle shown in this figure and in Figure 4. The shank 25 of the jaw H also has a lug 32 that extends at the angle shown in Figures 4 and 7. Bolts 33 and 34 are placed in the openings 35 and 36 provided in the lugs 31 and 32, and a coil spring 37 has its ends connected to the bolts. The purpose of the spring is to urge the lugs 31 and 32 toward each other and to swing the jaws so that their tire-gripping portions 29 and 30 will be moved away from each other as indicated in Figure 4.

The means for moving the jaws toward each other is shown in Figures 1 and 2 and comprises U-shaped heads 38 and 39 formed on the bolts 33 and 34. The U-shaped heads project rearwardly of the member C and pivotally receive links 40 and 41 of a toggle mechanism indicated generally at J. Figures 1 and 2 clearly show the links 40 and 41 pivoted at 42 and 43 to the U-shaped heads 38 and 39. The free ends of the links are pivoted together and also pivoted to the U-shaped end 44 of a piston rod 45 at 44a. The piston rod extends into the cylinder B and carries a piston head 45a which is slidably mounted in the cylinder.

Guide links 46 and 47 for the toggle J are pivoted to the mid-portions of the links 40 and 41 at 48 and 49. The other ends of the guide links are pivoted together by a bolt 50 and the shank of this bolt is received in the recess 8a in the lug 8. Coil springs 51 and 52 are connected to the piston rod 45 by a connecting member 53 and the other ends of the springs are connected to hooks 54 and 55, which in turn are welded or otherwise secured to one of the circular split bands 3 that is connected to the cylinder B. The function of the springs 51 and 52 is to act on the piston rod 45 for returning the piston head 45a to the top of the cylinder B. The springs 51 and 52 cooperate with the spring 37 in this respect.

A hose 56 for conveying compressed air to the cylinder B is connected to a valve 57 that is placed at the juncture of the hand grip 16 with the hollow handle F. A manually actuated button 58 may be depressed for admitting air from the compressed hose into the hollow handle and this air is then fed into the cylinder for urging the piston head 45a from the position shown in Figure 1 into that shown in Figure 2. The moving piston will cause the piston rod 45 to act on the toggle mechanism J to swing the jaws from the tire receiving position shown in Figure 1 into the tire collapsing position shown in Figure 2.

It is possible to use compressed air for returning the piston head from the position shown in Figure 2 back into the position shown in Figure 1. While I have shown the springs 51 and 52 cooperating with the spring 37 for accomplishing this return movement, it is obvious that air may be used for opening the jaws. During the return movement of the piston, the air in the cylinder will escape through an exhaust valve 59, the operator depressing a button 60 for opening this valve, see Figure 3. A fluid could be used for moving the piston in both directions instead of compressed air.

From the foregoing description of the various parts of the device, the operation thereof may be readily understood.

In Figure 12 I show the device moved into a position with relation to a tire K so that the tire gripping portion 29 of the jaw G will be disposed adjacent to one side of the tire casing and the other tire gripping portion 30 of the jaw H will be placed so as to contact with the tire rim L. The longitudinal axis of the device indicated by the dot dash line 61 in Figure 12 will extend at an angle to the dot dash line 62 indicating the plane of the wheel. Figure 11 shows the tire gripping portion 30 of the jaw H contacting with the rim L while the wheel is still on the automobile axle.

When the jaws are in proper position, the operator presses the button 58 of the valve 57 and compressed air will be admitted into the cylinder B. The piston head 45a will be moved from the dotted line position shown in Figure 1 into the dotted line position shown in Figure 2. The tire gripping portions 29 and 30 of the jaws G and H will be moved toward each other and I have shown arrows $a$ in Figure 12 to indicate the direction of movement of the tire gripping portion 29. This portion will clear the tire rim L and will collapse the tire casing K and move it to the dot dash line position shown at K' in the same figure.

The operator can use the device in the manner shown in Figure 12 when either one or both of the beads 63 of the tire are "frozen" in the groove portions or safety wells 64 of the safety rim L. After the portion 29 has released its side of the tire from the groove 64, the operator can exhaust the compressed air from the cylinder B by pressing on the button 60 to open the exhaust valve 59 and this will permit the springs to open the jaws. The device may now be swung into an angular position where the portion 29 of the jaw G will contact with the tire rim L and the portion 30 will contact with the tire casing. A second pressing of the button 58 will cause the jaws to move toward each other and free the tire bead 63 that is disposed closest to the portion 30. In this simple way both tire beads are removed from their safety grooves and the wheel need not be removed from the axle.

In Figure 4 I show the jaws G and H in open position and in Figure 5 I show them in a position where both tire beads 63 have been removed from their safety grooves 64 in the tire rim L. If neither bead is "frozen" in its groove, the device may be moved into a position where its longitudinal axis 61 will parallel the plane 62 of the wheel. I have found from actual practice that it is better to remove one tire bead at a time from its safety groove. The device may be moved under the tire when the wheel is raised a slight distance such as two to three and one-half inches above the ground 65 as shown in Figure 11. It is a simple matter to raise or lower the tire gripping portions 29 and 30 with respect to the tire or the rim by merely raising or lowering the handle F. The wheels E are positioned ahead of the jaws and act as pivots for the frame A as the latter is raised or lowered by the hand grip 16 for raising or lowering the jaws with respect to the tire K. The operator has complete control of the device at all times.

The device is designed so as to be readily moved under an automobile fender such as that shown at 66 in Figure 11. These fenders are low and applicant has designed his device so that the operator can raise the handle with respect to the ground to lower the jaws so that they can be moved under the fender and then the handle may be lowered into the position shown in Figure 11 for bringing the jaws into proper tire-receiving relation while the tire and wheel still remain on the automobile. It is possible with the device to remove the tire casing and the inner tube from the wheel without removing the wheel from the automobile.

In Figure 6 I show how the device can be swung into an upright position when the device is not in use. In this case the tire gripping portions 29 and 30 will rest on the ground 65 and the legs 14 and 15 will also rest on the ground. This will cause the frame A and the handle F to extend in an upward direction. The device will occupy little space when in this position, and the hand grip 16 will be disposed where it may be readily grasped when the operator wishes to move the device or to use it.

In Figures 13 to 15, inclusive, I show the tire gripping jaw provided with a resilient padding that has recesses for providing a plurality of suction cups. The jaw shown in Figure 15 may be either the jaw G or the jaw H. I have indicated the jaw as G' and this jaw has a plate 67 which takes the place of the tire gripping portion 29. The plate has a flange 68 that is substantially in the shape of a semicircle and a resilient padding 69, preferably made of rubber, is placed on the plate and bears against the flange. The padding 69 is secured to the plate by bolts 70 which in turn are imbedded in the padding.

Figure 14 illustrates how the face of the padding has a central flat portion 71 and two side portions 72 that extend at a slight angle with respect to the portion 71. The edge 68a of the flange 68 is shaped so as to conform to the surfaces 71 and 72. The surfaces 71 and 72 have recesses 73 therein which constitute suction cups. It will be noted in Figure 15 that a lower surface portion 74 extends at an inwardly inclined angle to the central portion 71 and to the side portions 72. When the padded jaws are used in place of the tire-gripping portions 29 and 30, they will grip the tire casing or tire rim more readily and there will be less likelihood of slippage during the movement of the jaws toward each other. Moreover, the angles of the surfaces 72 with respect to the surface 71 permits the device to be moved into the angular positions indicated in Figure 12 with respect to the tire and the gripping force of the padded portions will not be impaired by this angular positioning of the device with respect to the tire. The inclined lower portion 74 of the pad provides space to accommodate the transverse curvature of the tire while permitting the surface 71 to contact with the tire portion disposed adjacent to the tire bead.

It will be noted from Figure 5, that when the tire-gripping portions 29 and 30 are moved toward each other for removing the tire beads 63 from the safety grooves 64 in the rim L, the lower portions of the jaw shanks disposed below the pivot points 21 and 26, will open up by swinging into a lower position, and this will provide ample space into which the tire casing may move. In this way the tire casing is not unduly cramped or pinched when being loosened from the rim. The inner surfaces of the jaws remain the same in overall length, whether the jaws are opened or closed and therefore the tire will not be restricted within an area too small for its size when the jaws are urged toward each other for collapsing the tire casing. When the jaws G and H are in open position, as shown in Figure 4, the jaw shanks 20 and 25 will act as guides and positioners for the tire gripping portions 29 and 30 because the shanks will contact with the lower portion of the tire casing K. When the jaws are moved into tire gripping position as shown in Figure 5, the tire gripping portions 29 and 30 will engage with the tire at the proper points to free the tire beads 63 from the safety wells 64.

I claim:

1. A power grip bead breaker for a tire while the wheel remains on the axle comprising an elongated frame having wheels at its forward end and a handle rigidly secured to the frame at its other end for guiding the frame under the fender of a car, a pair of tire-gripping jaws placed in back of the wheels and near the forward end of the frame and lying in a plane that extends substantially at right angles to the plane of the frame, said jaws projecting upwardly substantially in a vertical direction when the frame is in a substantially horizontal position, the wheels spacing the frame a slight distance above the ground so that the jaws can engage with the lower portion of the tire when the vehicle wheel is raised above the ground and be adjusted vertically by swinging the frame about the front wheels, and power means for moving the jaws toward each other for freeing the tire from the rim, the jaw being raised with respect to the tire when the handle is raised and vice versa.

2. In a bead breaker for a tire having its beads mounted in the safety grooves of a safety tire rim; a frame, a pair of jaws pivotally carried intermediate their ends by the frame at spaced points and having tire gripping portions movable toward and away from each other; the jaws also having shanks positioned on the other side of the jaw pivot points from the tire gripping portions; said shanks being designed to contact a tire tread when the jaws are open for positioning the tire gripping portions of the jaws in proper relation to the beads of the tire; and means for moving the tire gripping portions toward each other for removing the tire beads from their safety grooves; the pivot points of the jaws being disposed close to the tire and at opposite sides thereof; whereby the tire bead portions gripped by the jaws will be lifted out of their safety grooves in the rim during the initial movement of the tire gripping portions toward each other; the shank portions of the jaws being swung away from the tire tread during this movement for providing sufficient additional space to receive the compressed tire portion.

3. In a bead breaker for a tire; an elongated frame having a handle disposed at one end of the frame and lying substantially in the plane of the frame; legs projecting forwardly from the end of the frame disposed opposite to the end that has the handle, said legs lying substantially in the same plane as that of the frame; tire gripping jaws extending at approximately right angles to the plane of the frame and positioned adjacent to the legs of the frame; and wheels secured to the sides of the legs extending in a direction opposite to that of the jaws and movably supporting the frame when the frame is in use and the jaws project upwardly; the ends of said legs and jaws adapted to support the frame in an upright position when the latter is not in use; the legs also supporting the wheels clear of the ground when the frame is in its upright position.

4. In a power grip bead breaker for a tire, a pair of jaws each having an arcuate-shaped shank at one end and a tire gripping portion at the other end; a U-shaped support having sides spaced from each other to provide a recess therebetween; one of the jaws being pivotally mounted intermediate its ends on one of the sides and having its shank extending into the recess; the other jaw being pivotally mounted intermediate its ends on the other side of the support and having its shank extending into the recess and cooperating with the other shank to form a tire-receiving recess and tire contacting portions that position the tire gripping portions on opposite sides of the tire; and means for swinging the jaws about their spaced-apart pivots for moving the tire gripping portions towards each other for causing these portions to contact opposite sides of the tire and move the two beads of the contacted portions, toward each other; the arcuate jaw shanks that extend into the recess being moved away from each other during this movement for enlarging the tire-receiving recess formed by the shanks, thus providing additional space for receiving the collapsed portion of the tire as the tire beads of this portion are removed from the tire rim.

JOSEPH N. JOHNSON.

References Cited in the file of this patent

UNITED STATES PATENTS

| Number | Name | Date |
|---|---|---|
| 412,199 | McIlhenny | Oct. 1, 1889 |
| 1,822,501 | Onsrud | Sept. 8, 1931 |
| 1,888,834 | Puleo | Nov. 22, 1932 |
| 1,966,766 | Raby et al. | July 17, 1934 |
| 2,154,869 | Sampson | Apr. 18, 1939 |
| 2,199,162 | Oliva | Apr. 30, 1940 |
| 2,212,768 | Bonneau | Aug. 27, 1940 |
| 2,333,880 | Ohlsen | Nov. 9, 1943 |
| 2,439,135 | Johnson et al. | Apr. 6, 1948 |
| 2,506,007 | Winstead | May 2, 1950 |
| 2,534,950 | Butterfield et al. | Dec. 19, 1950 |
| 2,537,189 | King | Jan. 9, 1951 |